Figure 1:
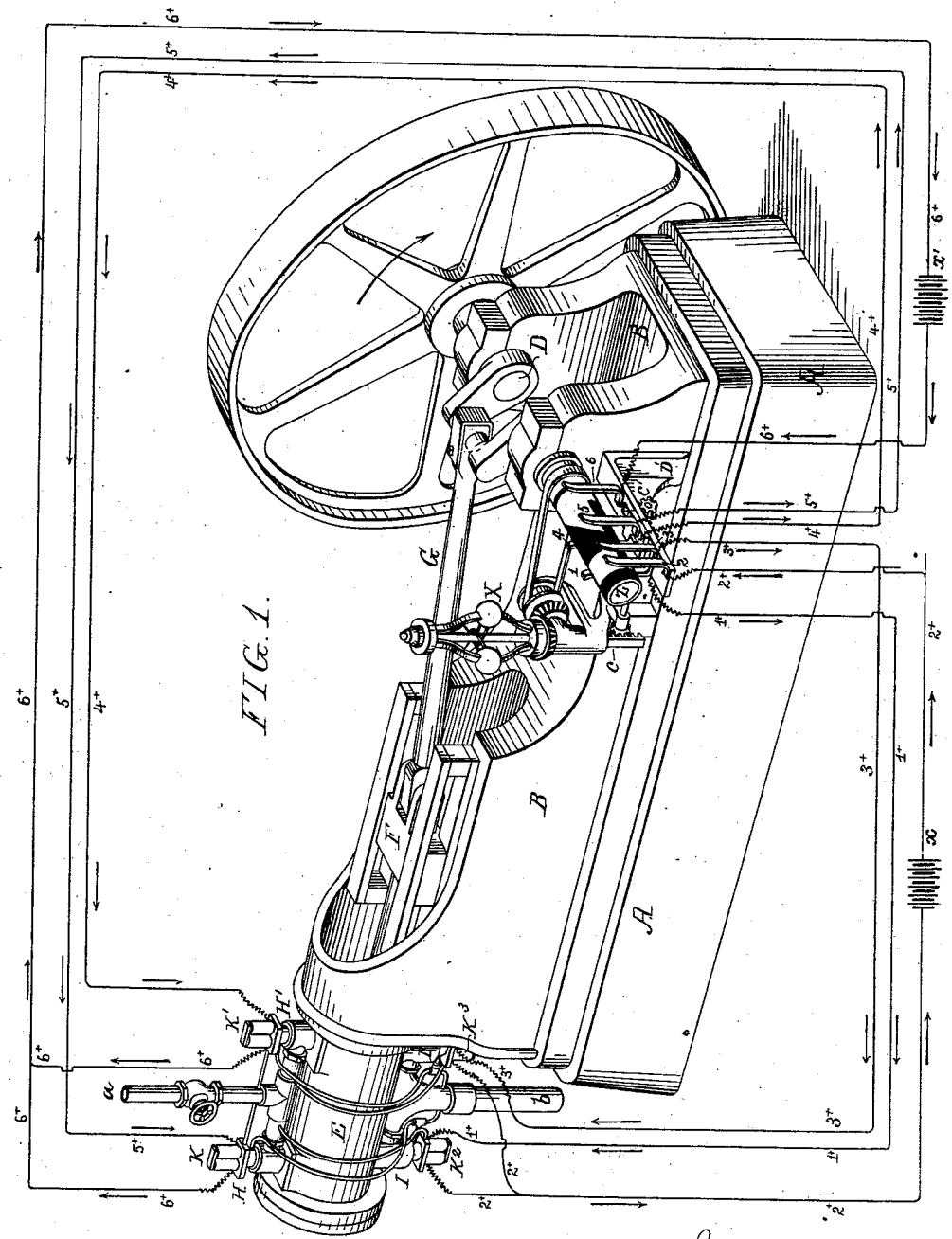

(No Model.)

G. W. STORER.
ELECTRIC VALVE GEAR FOR STEAM ENGINES.

No. 281,579. Patented July 17, 1883.

Witnesses
James J. Tobin
Hamilton D. Turner

Inventor
George W. Storer
by his Attys
Howson and Sons (No Model.) 4 Sheets—Sheet 2.
G. W. STORER.
ELECTRIC VALVE GEAR FOR STEAM ENGINES.
No. 281,579. Patented July 17, 1883.
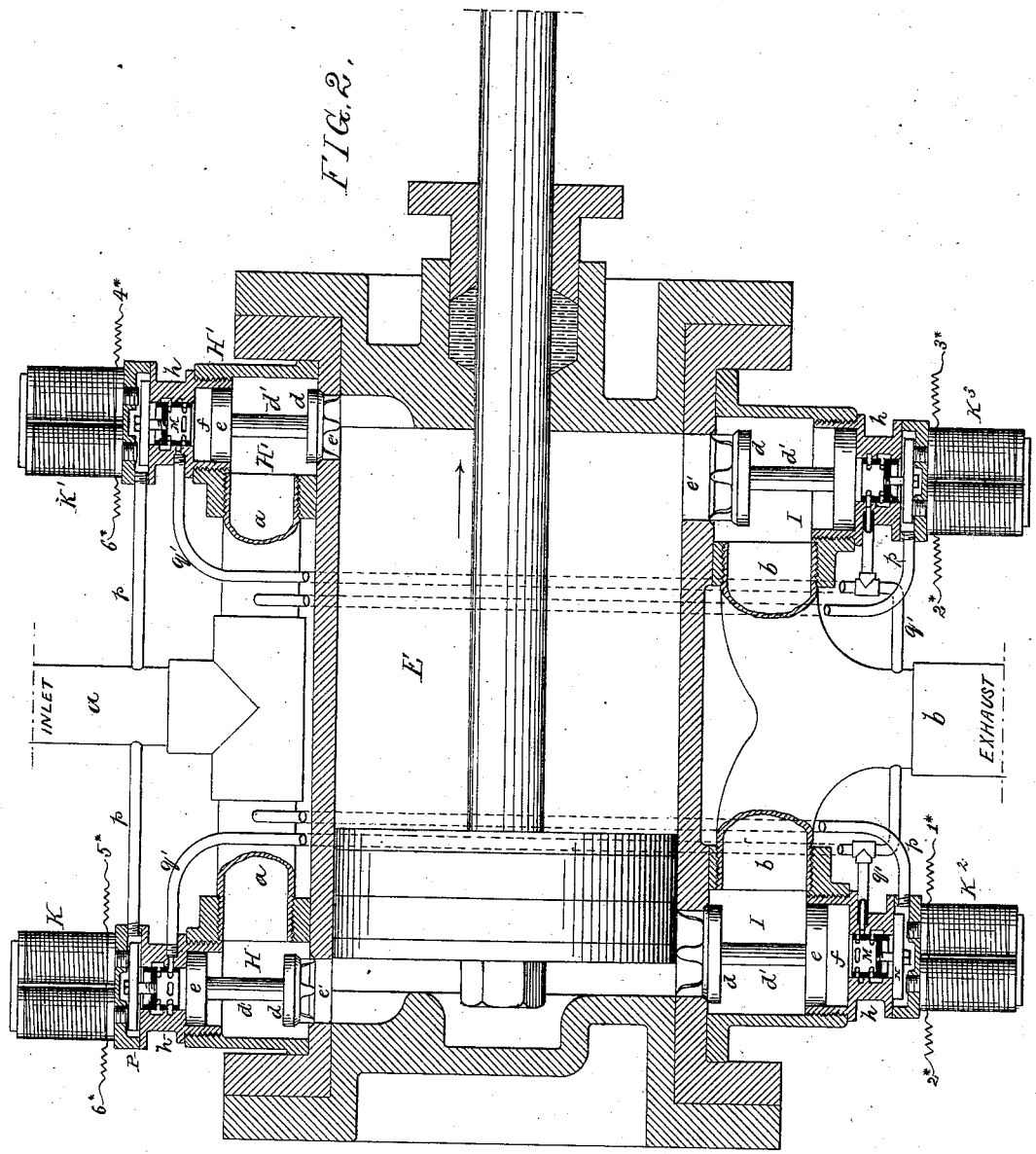
Witnesses
James F. Tobin
Hamilton D. Turner
Inventor
George W. Storer
by his Attys
Howsm and Son (No Model.) 4 Sheets—Sheet 3.
G. W. STORER.
ELECTRIC VALVE GEAR FOR STEAM ENGINES.
No. 281,579. Patented July 17, 1883.
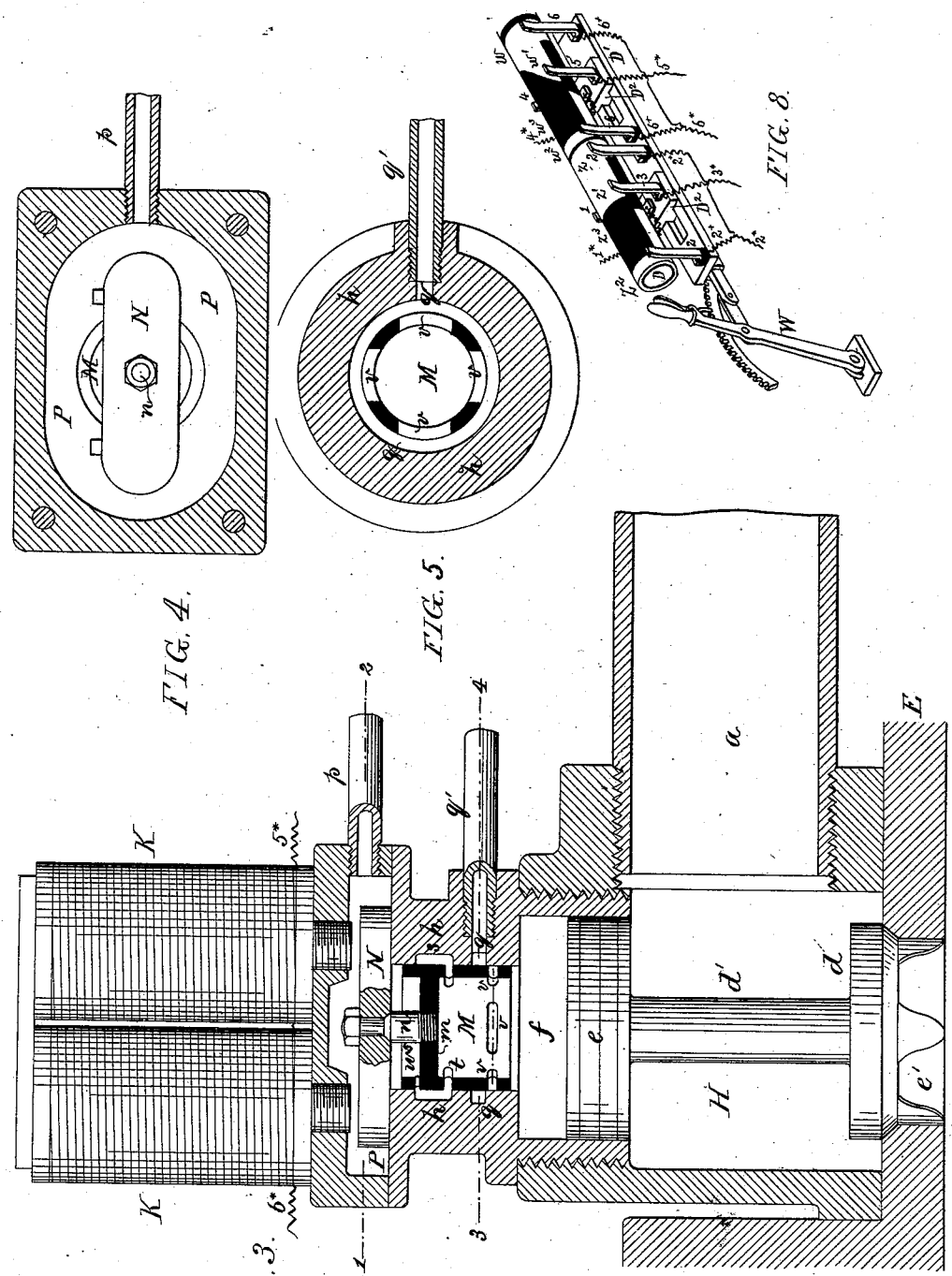

(No Model.) 4 Sheets—Sheet 4.
G. W. STORER.
ELECTRIC VALVE GEAR FOR STEAM ENGINES.
No. 281,579. Patented July 17, 1883.
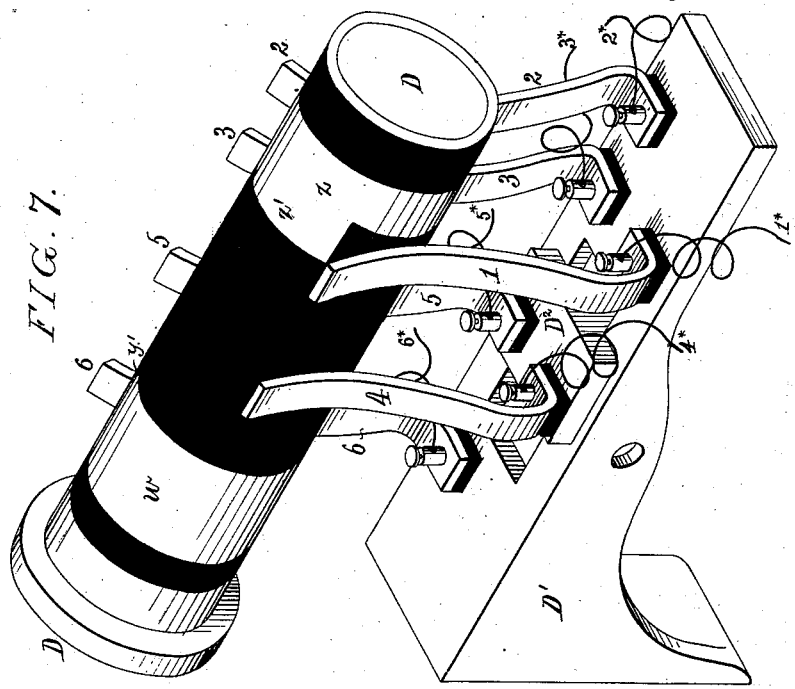
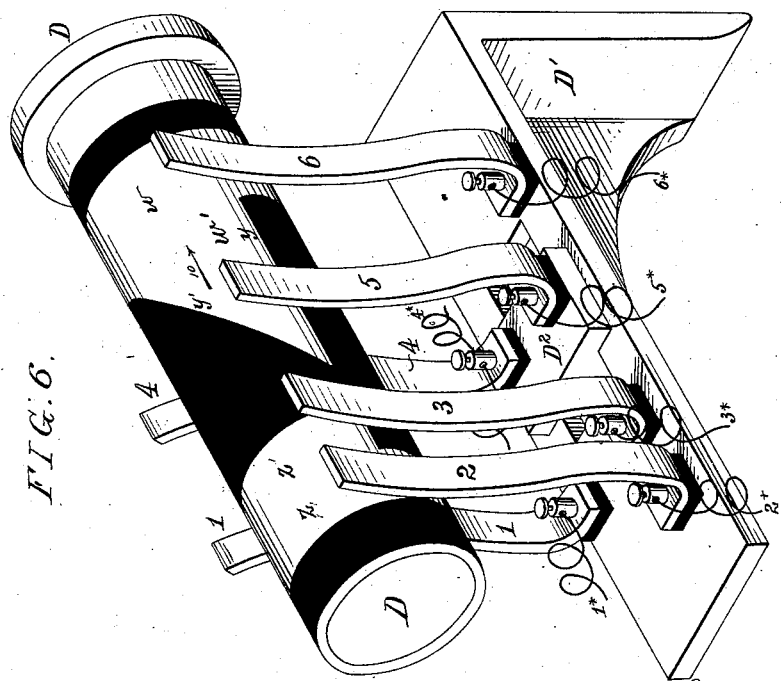
Witnesses
James F. Tobin
Hamilton D. Turner
Inventor
George W. Storer
by his Attorneys
Howson and Son

UNITED STATES PATENT OFFICE.

GEORGE W. STORER, OF PHILADELPHIA, PENNSYLVANIA.

ELECTRIC VALVE-GEAR FOR STEAM-ENGINES.

SPECIFICATION forming part of Letters Patent No. 281,579, dated July 17, 1883.

Application filed October 23, 1882. (No model.)

*To all whom it may concern:*

Be it known that I, GEORGE W. STORER, a citizen of the United States, and a resident of Philadelphia, Pennsylvania, have invented certain Electric Valve-Gears for Steam-Engines, of which the following is a specification.

The main object of my invention is to dispense with the ordinary cumbrous, costly, and power-absorbing appliances for operating the valves of steam-engines, and this object I attain through the agency of electricity, my invention consisting, mainly, in the combination of the steam and exhaust valves of a steam-engine with electro-magnets, a battery or batteries or other generators of electricity, and a commutator controlled by the engine.

Other features of my invention are too fully explained hereinafter to need preliminary description.

In the accompanying drawings, Figure 1, Sheet 1, is a perspective view of a steam-engine illustrating the main feature of my invention; Fig. 2, Sheet 2, a vertical section drawn to an enlarged scale, and showing the steam-cylinder, valves, magnets, &c.; Fig. 3, Sheet 3, a vertical section, drawn to a still larger scale, of the valve, valve-chest, and appliances connected therewith; Fig. 4, a sectional plan on the line 1 2, Fig. 3; Fig. 5, a sectional plan on the line 3 4, Fig. 3; Figs. 6 and 7, Sheet 4, perspective views, showing opposite sides of the commutator; and Fig. 8, Sheet 3, a view of a modified form of commutator.

The main feature of my invention may be best explained in connection with Fig. 1, in which a steam-engine of the horizontal type has been shown to illustrate the said main feature; but my invention is applicable to other types of steam-engines.

A is the foundation of the engine; B, the bed-plate and frame; E, the steam-cylinder, having the usual piston, the rod of which is secured to a cross-head, F, the latter being connected to the crank-pin by the usual rod, G. On the top of the cylinder are two small valve-chests, H H', communicating with the steam-pipe $a$, the chest H, and its valve, for alternately admitting steam to and excluding it from the interior of the cylinder at the rear end of the same, and the chest H' and its valve, for alternately admitting steam to and excluding it from the cylinder at the front end of the same. On the under side of the steam-cylinder are two similar valve-chests, I I', communicating with the exhaust-pipe $b$, the chest I and its valve, for alternately opening and closing the exhaust-port at the rear end of the cylinder, and the chest I' and its valve, for alternately opening and closing the exhaust-port at the front end of the cylinder. Each valve is operated through the medium of an electro-magnet controlled by a battery or batteries or other generators of electricity, in obedience to the action of a commutator which is under the control of the engine, two batteries being used in the present instance.

The commutator for changing the circuits and putting the coils of one or other of the electro-magnets in circuit to operate the corresponding valve is operated from some moving part of the engine, and in the drawings I have shown it applied directly to an extension of the crank-shaft. I prefer to construct the commutator of a sleeve fitted on the continuation of the shaft, but insulated therefrom and provided with insulated segments, as hereinafter described, and illustrated more fully in Figs. 1, 6, and 7.

The commutator-brushes are carried by but insulated from a bracket, D', on the frame of the engine, there being shown in the present instance six of these insulated brushes, 1, 2, 3, 4, 5, and 6, to which the terminal wires of the circuit are connected.

The contact-plates of the commutator are two in number, and are annular or extend entirely round, but are provided with offsets, the plate $z$ being provided with a semi-annular offset, $z'$, while the plate $w$ has a tapering offset, $w'$, one edge, $y$, of this offset being parallel with the axis of the shaft, while the other edge, Fig. 6, is at an angle thereto, for a purpose explained hereinafter. The brush 2 is always in contact with the annular portion of the plate $z$, while the brushes 1 and 3, which are directly opposite each other, are alternately brought into contact with the semi-annular offset $z'$ as the commutator revolves. The brush 6 is always in contact with the annular plate $w$, while the brushes 4 and 5, opposite to each other, alternately come into contact with the tapering offset $w'$ of the plate $w$ as the commutator rotates.

The circuits are illustrated in Fig. 1, and, for the sake of simplicity, the different wires connected to the different brushes bear the same numbers. Thus the brush 1 is connected through the conductor 1* with the coils of the electro-magnet $K^2$, for operating the valve of the exhaust-chest I, the return-conductor 2* being connected to the brush 2, and having a battery, $x$, in circuit. The brush 3 is connected through the conductor 3* with the coils of the electro-magnet $K^3$ of the front exhaust-valve chest, I', the other terminal of the coil being connected to the return-conductor 2*. The brush 4 is connected through the conductor 4* with the coils of the electro-magnet K' of the front steam-valve chest, H', the return-conductor 6* being connected to the brush 6, and having a battery, $x'$, in circuit. The brush 5 is connected through the conductor 5* with the coils of the electro-magnet K of the rear steam-inlet valve-chest, H, the other terminal of the coils being connected to the return-wire 6*.

The particular construction of the valves I prefer to employ will be described more fully hereinafter. It will be sufficient for the present to explain that whenever a current of electricity is passed through the coils of one of the electro-magnets the valve controlled thereby is opened, and when the coils of that electro-magnet are thrown out of circuit the valve immediately closes. Thus when, during the revolution of the commutator, the brush 5 comes into contact with the offset $w'$ of the plate $w$, as indicated in Figs. 1 and 6, the circuit through the coils of the electro-magnet K will be closed, (thus battery $x'$, conductor 6*, brush 6, plate $w$, offset $w'$, brush 5, conductor 5*, coils K, and conductor 6*, back to battery,) the inlet-valve in the chest H will be thereby opened and the steam admitted to the cylinder at the rear of the piston. About the same time the brush 3 has come into contact with the offset $z'$ of the commutator-plate $z$ and the circuit closed through the coils of the electro-magnet $K^3$, (battery $x$, conductor 2*, brush 2, plate $z$, brush 3, conductor 3*, coils $K^3$, and back to battery $x$,) the valve in the valve-chest I' opened, and steam allowed to escape from the cylinder at the front of the piston, the positions of the several parts of the engine at this point—that is, immediately after the commencement of the forward stroke of the engine—being illustrated in Fig. 1. As the crank-shaft continues to revolve, the offset $w'$ of the commutator-plate $w$ will leave contact with the brush 5, the electro-magnet K thereby thrown out of circuit, and the valve in the steam-chest H immediately closed, and the admission of steam thus cut off. Then when the piston reaches the end of its stroke the offset $z'$ of the commutator-plate $z$ will have left contact with the brush 3, the electro-magnet $K^3$ thrown out of circuit, and the valve in the exhaust-chest I' closed. At the same moment the offset of the commutator-plate $w$ will have come into contact with the brush 4 to close the circuit through the electro-magnet K' and open the steam-valve in the chest H' for the return-stroke, and the exhaust-valve in the chest I is simultaneously opened by the closing of the circuit through the coils of the electro-magnet $K^2$ by the offset of the commutator-plate $z$ coming into contact with the brush 1. Thus, as the crank-shaft revolves the proper inlet and exhaust valves are alternately opened and closed at the proper moments by the closing and breaking of the electrical circuits by the commutator.

As it is desirable that the time during a revolution of the crank-shaft when the steam is cut off during both the forward and rearward movement of the piston should be easily regulated, I secure the brushes 4 and 5, which control the circuits of the electro-magnets operating the two steam-inlet valves, to a plate made adjustable on the bracket D'. The farther in the direction of the arrow 10, Fig. 6, these two brushes are adjusted, the longer will the circuit remain closed and the steam-valve therefore be open, and the farther the brushes are adjusted in a contrary direction the quicker will the circuit be broken and the steam cut off. This, it will be understood, is due to the inclined edge $y'$ of the offset $w'$ of the commutator-plate $w$.

I prefer to place the adjustable front and rear steam-valve brushes under the control of a small governor, X, driven by the engine. This may be done in several ways. In the present instance a rack, $c$, gears into a pinion on a shaft, $c'$, and another pinion on the same shaft gears into a rack on the under side of the sliding plate, which carries the brushes 4 and 5. The location of governors varies so much in different engines that connections other than that described for causing the governor to adjust the said brushes may be adopted.

In applying my invention to steam-engines which have to be repeatedly reversed I duplicate the commutator-brushes 2 and 6 and the commutator-plates, one set of the latter being arranged in positions the reverse of the other set of plates, as indicated in the perspective diagram, Fig. 8, where 2' and 6' are the duplicate brushes, connected to the conductors 2* and 6*, respectively, and always in contact, respectively, with the duplicate commutator-plates $z^2$ and $w^2$, respectively. The semi-annular offset $z^3$ of the plate $z^2$ is arranged on the periphery of the commutator in a position exactly the reverse of that of the offset $z'$ of the plate $z$, and in like manner the duplicate plate $w^2$, with its offset $w^3$, is arranged in a reverse position from the plate $w$. The brushes 1 and 3, as well as the brushes 4 and 5, are mounted on a movable plate, $D^2$; or they may be mounted on the same plate, which is under the control of a suitable hand-lever, W, so that by moving the latter to a limited extent within the range of the offsets the cut off of the steam may be regulated, as before described, and the duplicate sets of commutator-plates are set sufficiently apart that the brushes 1 3 and 4 5 may be moved to positions between the plates without being in contact with either, and so stop the engine. By moving the said brushes over from one set of commutator-plates to the other the latter will so change the circuits and operate the valves as to reverse the engine, in a manner which will be readily understood by reference to the preceding description of the operation of the valve.

The electrically-operated valve which I prefer to adopt in carrying out my invention when batteries are used as generators of electricity is a modified form of the valve for which I obtained Letters Patent January 1, 1881, No. 236,645, and is illustrated in Fig. 2, Sheet 2, and on a larger scale in Figs. 3, 4, and 5, Sheet 3. Referring to the latter sheet, H is one of the steam-chests, and $d$ the valve, adapted to a seat on the edge of the port $e'$, forming a communication between the chest and the interior of the cylinder, the valve being united by a stem, $d'$, to a piston, $e$, adapted to a small cylinder, $f$, which is in direct communication with a still smaller cylinder, $h$, and with the interior of a cylindrical valve, M, having a transverse partition, $m$, to which the armature N is connected by a stud, $n$, this armature being contained within a chamber, P, through the top of which are screwed the poles of the two magnets K K. Live steam is admitted at all times through a small pipe, $p$, to the chamber P, and an annular passage, $q$, formed within the small cylinder $h$, always communicates with the exhaust passage or pipe $q'$, connected with the main exhaust-pipe $b$ of the engine, Fig. 2. There is within the smaller cylinder $h$ another annular recess, $s$, which is always in communication with the interior of the cylindrical valve M through the steam-inlet ports $t$, a lower set of ports, $v$, forming the outlet-ports, and communicating, under the circumstances explained hereinafter, with the annular recess $q$ and exhaust-pipe $q'$. In the valve M, above the partition $m$, is an inlet-port, $w^5$, which, when the valve is in the position shown in Fig. 3, admits live steam from the chamber P to the interior of the valve M through the recess $s$ and inlet-port $t$.

When the several parts are in the position shown in Fig. 3, the electrical circuit has been broken and the valve $d$ is on its seat, thereby preventing the entrance of steam to the cylinder through the port $e'$. When the valve $d$ is thus on its seat, there is the pressure of live steam admitted through the port $w^5$ of the cylindrical valve and recess $s$ to the interior of the said valve upon the piston $e$. There is also the pressure of live steam on the under side of the piston and on the top of the valve; but the area of the upper surface of the piston is such in relation to that of the valve and of the underside of the piston that there is an excess of pressure on the valve to keep the valve down. The moment the circuit is closed again the valve M will rise, owing to the influence of the magnets on the armature N, and communication will be cut off between the chamber P and the interior of the cylindrical valve M, and the latter will be opened to the exhaust. Under these circumstances, as the area of the under side of the piston is greater than that of the valve $d$ and as pressure on the top of the piston has ceased, the valve will instantly rise and admit steam to the main cylinder, and will continue to do so until the circuit is broken, when the several parts will assume their original positions shown in Fig. 3.

It will be understood that the movements described are instantaneous; and it may be remarked here that the prompt action of the valves is one of the main advantages of my invention.

The construction and operation of the exhaust-valves will be understood from the foregoing description without explanation, the only difference between the steam and exhaust valves being in the diameters, the latter valves being preferably larger than the former.

It will be understood that, although I have described the foregoing construction of valve in its details, it does not form an essential part of the present application, and I do not limit myself to the described construction. The armature of the electro-magnet may, for instance, be connected directly to the valve to be operated, providing the latter be delicately balanced and a sufficiently-powerful current of electricity be employed. If, for instance, the engine be used for driving a dynamo-electric machine, a powerful current of electricity will be available for operating the valves. In ordinary cases, however, where the most available source of electricity is a battery, I prefer to employ a supplementary valve secured to the armature to control the main valve, such as that described above, or as described and claimed in my aforesaid patent.

I claim as my invention—

1. The combination, in an engine, of the following elements, namely: first, inlet and exhaust valves; second, electro-magnets through the agency of which the valves are operated; third, a source of electricity; and, fourth, a commutator operated by the engine for determining the movements of the valves, substantially as set forth.

2. The combination, in an engine, of inlet and exhaust valves, electro-magnets, and a source of electricity, with a commutator on a shaft driven by the engine, and commutator-brushes, substantially as described.

3. The combination of the inlet and exhaust valves of an engine, electro-magnets controlling said valves, and electrical circuits, with commutator-brushes, and a commutator mounted on the crank-shaft of the engine.

4. The combination of the inlet and exhaust valves of an engine, electro-magnets and circuits, with a commutator operated by the engine, commutator-brushes, and devices, substantially as described, for regulating the length of closure of the circuits controlling the inlet-valves to vary the cut-off.

5. The combination of the inlet and exhaust valves of an engine, electro-magnets, circuits, a commutator, and commutator-brushes, with a governor operated by the engine, and devices, substantially as described, controlled by the governor, for regulating the length of closure of the circuits.

6. The combination of the inlet-valves of an engine, electro-magnets, and circuits, with a commutator having a tapering contact-plate, commutator-brushes, one or more of which are movable, and a governor controlling the movable brush or brushes.

In testimony whereof I have signed my name to this specification in the presence of two subscribing witnesses.

GEORGE W. STORER.

Witnesses:
HARRY DRURY,
HARRY SMITH.